UNITED STATES PATENT OFFICE.

JAMES W. RYDER, OF NEW YORK, N. Y., ASSIGNOR TO SPECIFICATION SOAP & OIL CO., INC., OF NEW YORK, N. Y., A CORPORATION OF NEW YORK.

PROCESS OF MAKING SOFT TRANSPARENT SODIUM OIL-SOAPS.

1,212,818. Specification of Letters Patent. Patented Jan. 16, 1917.

No Drawing. Application filed July 12, 1915. Serial No. 39,257.

*To all whom it may concern:*

Be it known that I, JAMES W. RYDER, a citizen of the United States of America, and a resident of New York, county and State of New York, have invented certain new and useful Improvements in Processes of Making Soft Transparent Sodium Oil-Soaps, of which the following is a specification.

This invention has reference to a novel process of producing oil soaps and especially vegetable oil soaps.

It pertains particularly to the production of transparent oil soaps of the soft varieties.

The present invention has for its special purpose to produce soft transparent oil soaps directly during the process of manufacture. Various kinds of oil especially vegetable oils are used with the novel process which is carried out without the aid of any potash employed in making soft transparent oil soaps. The present scarcity and exorbitant price of potash render its use prohibitive in the art of producing soft oil soaps. The novel process forming the subject matter of this invention thus dispenses with the use of potash altogether and soft, transparent oil soap is produced by means of caustic soda, especially caustic soda lye. This has primarily been attained by preparing the oil before saponification so as to render it easily saponifiable. In order to prepare the oil, it is simply heated to a certain temperature and alcohol admixed therewith. The alcohol modifies the oil and renders it susceptible for the action of the caustic soda lye which then is added to the prepared mixture of oil and alcohol.

Various kinds of oil may be used in accordance with the present process, for instance linseed oil, corn oil, cotton seed oil, olive oil, soy bean oil, cocoanut oil, deodorized fish oil, etc. Of the various kinds of alcohol that may be employed, I prefer to use the denatured alcohol on account of its reasonable price and its efficiency because it is ethylic alcohol which is known to be chemically very active.

In carrying the present invention into effect, I substantially proceed as follows: A vegetable oil, for instance linseed oil is heated to a temperature of from 100–110° F. At this temperature the alcohol preferably denatured alcohol is incorporated with the oil. The mixture is well agitated until a uniform mass has been obtained. Now caustic soda lye is added having a temperature of from 60–90° F. and the mixture well agitated. After the action of the lye on the mixture of oil and alcohol is complete some water is added at ordinary temperature. The entire mixture is now boiled until a complete combination has been effected and soft transparent soap of proper consistency is obtained. During the boiling of the mass the alcohol evaporates and is not found in the finished product. However, the alcohol has performed its useful functions during the process of manufacture by first modifying the oil at a certain temperature so that the oil is more susceptible for the action of the alkali, and second the alcohol effects that a transparent soap is directly produced during the process of manufacture.

The proportions in which the various components may be employed vary within reasonable limits particularly on account of the various kinds of oil that may be used. One formula giving good results with most of the vegetable oils is as follows: About 100 pounds of vegetable oil are heated to a temperature of from 100–110° F., then 3 pounds of denatured alcohol are incorporated and about one half the weight of the oil of caustic soda lye of 36° B. is admixed having a temperature of from 60–90° F. For certain oils the caustic soda lye may be of a different strength but of proportionate quantity, less of the strong and more of the weak lye may be required. To the mass so far described 30–60 per cent. of water are added at ordinary temperature and the entire mixture is then boiled until transparent soap of the desired consistency has been obtained which is indicated by the usual tests. The consistency of the resulting soap varies according to the length of time during which the boiling of the mass is continued. Various grades may be made as required for specific uses. Now the finished soap is allowed to cool.

I claim as my invention:

1. The process of producing soft, transparent sodium soaps from vegetable oils directly during manufacture consisting in preparing the oil by admixing a few per cent. of denatured alcohol therewith, saponifying the mixture of oil and alcohol by caustic soda lye, adding water up to about one half of the quantity of the mixture, and boiling the resulting mass until perfectly saponified, transparent soft soap is obtained.

2. The process of producing soft, transparent sodium soaps from vegetable oils directly during manufacture consisting in saponifying the oil by caustic soda lye, adding water up to about one half the quantity of the mixture, and boiling the resulting mass until perfectly saponified, transparent soft soap is obtained.

3. The process of producing soft, transparent sodium soaps from vegetable oils directly during manufacture consisting in preparing the oil by heating it to about 100–110° F. and then incorporating a few per cent. of alcohol therewith, saponifying the mixture by caustic soda lye, adding water up to about one half of the quantity of the mixture, and boiling the resulting mass until perfectly saponified, transparent soft soap is obtained.

4. The process of producing soft transparent soap of various consistency from vegetable oils directly during its manufacture consisting in heating about 100 pounds of vegetable oil to a temperature of from 100–110° F., incorporating with the heated oil about 3 pounds of denatured alcohol, admixing then about 50 pounds of caustic soda lye of 36° B. having a temperature of from 60–90° F., adding about 30–60 per cent. of water, and boiling the resulting mass until transparent soap of the desired consistency is obtained.

5. The process of producing soft, transparent sodium soaps from vegetable oils directly during manufacture consisting in preparing the oil at a temperature of 100–110° F. by admixing therewith a few per cent. of alcohol, saponifying the mixture by caustic soda lye having a temperature of from 60 to 90° F., adding water up to about one half of the quantity of the mass, and boiling the resulting mass until perfectly saponified, transparent soft soap is obtained.

Signed at New York, N. Y., this 10th day of July, 1915.

JAMES W. RYDER.

Witnesses:
SIGMUND RUBIN,
IDA C. ROLAND.